United States Patent
Hedman

(10) Patent No.: US 6,951,150 B2
(45) Date of Patent: Oct. 4, 2005

(54) GEARWHEEL INTENDED TO BE PRESS-FITTED ONTO A SHAFT AND A SHAFT CARRYING A PRESS-FITTED GEARWHEEL

(75) Inventor: Anders Hedman, Marstrand (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/064,229

(22) Filed: Jun. 21, 2002

(65) Prior Publication Data

US 2003/0037631 A1 Feb. 27, 2003

Related U.S. Application Data

(63) Continuation of application No. PCT/SE00/02647, filed on Dec. 21, 2000, now abandoned.

(51) Int. Cl.[7] .............................................. F16H 55/17
(52) U.S. Cl. ....................... 74/421 R; 403/345; 403/279
(58) Field of Search ............................... 74/431, 421 R, 74/423, 425; 403/345, 346, 393, 279, 300, 301; 29/893.2

(56) References Cited

U.S. PATENT DOCUMENTS

| 3,690,707 | A | * | 9/1972 | van Rooij et al. ............ 403/15 |
| 3,789,690 | A | * | 2/1974 | Droske ......................... 74/411 |
| 4,462,148 | A |   | 7/1984 | Joyce ........................... 29/447 |
| 4,509,381 | A | * | 4/1985 | Ikemoto et al. ............... 74/413 |
| 4,631,973 | A |   | 12/1986 | Eley ............................ 74/439 |
| 4,886,392 | A | * | 12/1989 | Iio .............................. 403/282 |
| 5,158,390 | A | * | 10/1992 | Ito et al. ...................... 403/282 |
| 5,299,881 | A |   | 4/1994 | Mettler-Friedli ............ 403/274 |
| 5,829,135 | A | * | 11/1998 | Koneda et al. ........... 29/892.11 |

FOREIGN PATENT DOCUMENTS

| DE | 3217574 A | * | 11/1983 | ............. F16D/1/04 |
| DE | 4338588 A1 |   | 6/1994 | |
| JP | 56080524 A | * | 7/1981 | ............. F16D/1/08 |

* cited by examiner

*Primary Examiner*—Thomas R. Hannon
*Assistant Examiner*—Timothy McAnulty
(74) *Attorney, Agent, or Firm*—Novak Druce LLP

(57) ABSTRACT

Gearwheel, intended to be connected through press fitting to a shaft, the gearwheel exhibiting a hub and a cog path connected to the hub, the hub exhibiting at least one flank extending axially outside the cog path and a through-hole with a first area situated axially outside the cog path and a second area situated radially inside the cog path. A shaft supporting a press fitted gearwheel that exhibits a hub and a cog path connected to the hub, the hub exhibiting at least one flank extending axially outside the cog path whereby the hub exhibits a through-hole with a first area situated axially outside the cog path and a second area situated radially inside the cog path.

23 Claims, 2 Drawing Sheets

GEARWHEEL INTENDED TO BE
PRESS-FITTED ONTO A SHAFT AND A
SHAFT CARRYING A PRESS-FITTED
GEARWHEEL

CROSS REFERENCE TO RELATED
APPLICATIONS

The present application is a continuation of International Application No. PCT/SE00/02647, filed Dec. 21, 2000 and published in English pursuant to PCT Article 21(2), now abandoned, and which claims priority to Swedish Application No. 9904756-5 filed Dec. 23, 1999. The disclosures of said applications are expressly incorporated herein by reference in their entireties.

BACKGROUND OF INVENTION

1. Technical Field

The present invention relates to a gearwheel intended for connection to a shaft through press fitting and to a shaft supporting a press fitted gearwheel. More particularly, the invention relates to a gearwheel, and a shaft supporting a gearwheel in which the press fitting is designed so that the average contact pressure in the press joint in a first area, situated radially within a cog path positioned on the gearwheel, is below the average contact pressure in an area situated outside that first area.

2. Background of the Invention

It is previously known, during manufacture of vehicle gearboxes, to utilize gearwheels that are connected to a shaft through press fitting. In this case, press fitting implies that the gearwheel has a central through-hole with a diameter smaller than that of the shaft to be inserted therein. In one assembly method, the gearwheel is forced into place, whereupon it is retained by the forces that arise due to the elastic deformation of the shaft and the gearwheel.

For example, the functional description of the Saab-Scania gearbox GRS900, Saab-Scania Division service (110) 1991, discloses a gearwheel equipped with a flange, which gearwheel is joined to a shaft in the gearbox through press fitting.

Press fitted gearwheels are used mainly when machining, construction, or economy does not allow the use of shafts with integrated gearwheels.

When a gearwheel is pressed onto a shaft in order to achieve a press joint, very large tensions arise in the gearwheel, as well as in the shaft. These tensions are a necessity to create a strong joint. In vehicle gearboxes, in particular in gearboxes for heavy vehicles, very large torques are transferred through the gearwheels included in the gearbox. In turn, this transferred torque gives rise to tensions, which are superimposed on the tensional field from the press fitting. The increased level of tension entails a risk for crack formation, in particular at the cog root, which leads to the possibility of a break due to fatigue.

SUMMARY OF INVENTION

An object of the invention is to provide a gearwheel, intended to be connected through press fitting to a shaft, and a shaft supporting a press fitted gearwheel in which the risk of crack formation at the cog root, and thus fatigue breakdown, is reduced.

By designing the gearwheel with at least one hub that exhibits a flank extending axially outside the cog path, and a through hole with a first area situated axially outside the cog path and a second area situated radially inside the cog path, and by arranging the gearwheel and the shaft in such a way that, during press fitting of the gearwheel on the intended shaft, the average contact pressure within the first area exceeds substantially the mean contact pressure within the second area, the tension in the area situated radially inside the cog path is reduced. This entails that the tensional field that arises through the press fitting is reduced within the area surrounding the cog path, with the consequence that the risk of fatigue failure in the cog root is diminished. During operation, a majority of the torque is transferred from the gearwheel to the shaft through the joint within the first area. A consequence is that the cog path is relieved from the load caused by the press fitting.

In a preferred embodiment, a relief zone is arranged between the first and second areas that is preferably formed as a concentric groove in the mantle surface of a cylindrical through-hole in the hub.

BRIEF DESCRIPTION OF DRAWINGS

The invention will be described in detail below, in connection with the enclosed drawings, in which.

DETAILED DESCRIPTION

Figure 1:
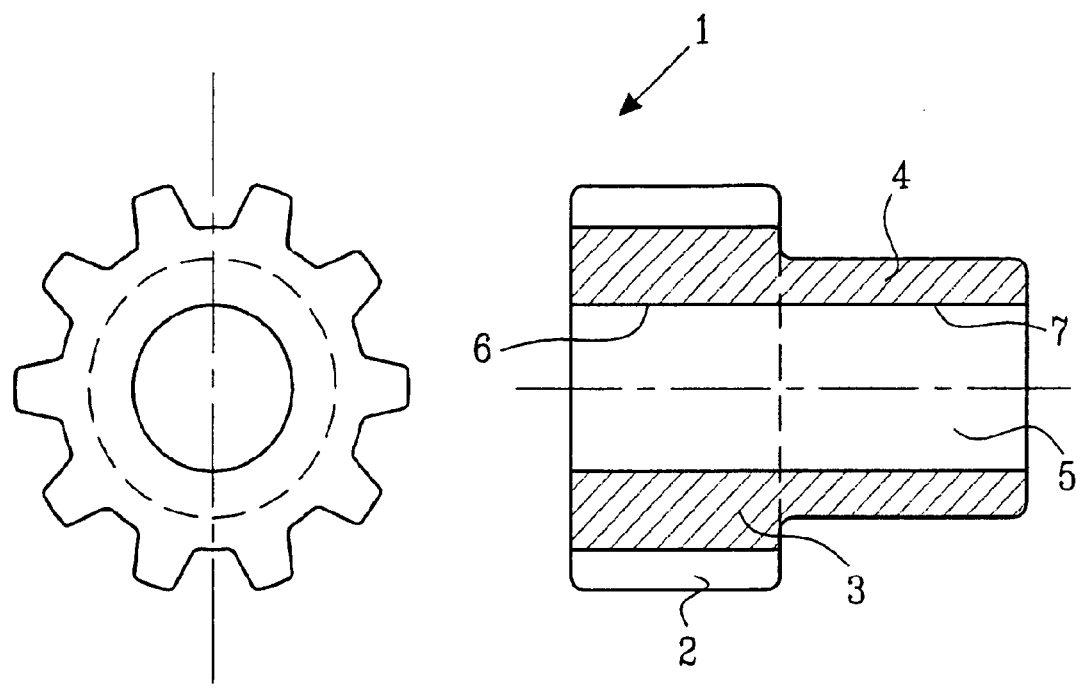
FIG. 1 shows an end view of a gearwheel equipped with a flank on the left side of the drawing and a side elevational cross-sectional view of the same on the right side of the drawing.

In FIG. 1, a gearwheel is show n which is generally designated as 1. The gearwheel supports a cog path 2, which is directed radially outwards. The cog path is connected to a hub 3. The hub 3 exhibits a flank 4, which extends axially outside the cog path. The hub 3 of the gearwheel exhibits a through-hole 5 which runs axially through the gearwheel. The gearwheel 1 is intended to be pressed onto a shaft (not shown), which exhibits a diameter slightly exceeding the diameter of the through-hole 5. In this manner a so-called press joint between the gearwheel and the shaft is accomplished. The through-hole 5 exhibits a mantle surface with a second area 6, situated radially inside said cog path, and a first area 7, situated outside said second area.

Figure 2:
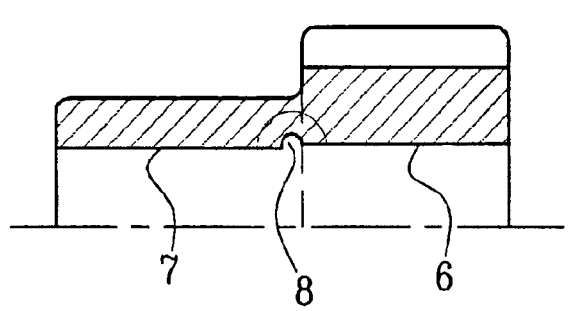
FIG. 2 is a symmetry half side cross-sectional view of the gearwheel according to a first embodiment of the invention.

FIG. 2 shows a cross-section of a symmetry half of the gearwheel according to a first embodiment of the invention. In this embodiment, the second and first areas 6, 7 are separated by a relief zone 8. The relief zone is constituted by a groove in the mantle surface. The function of the relief zone is to ensure that the tension that arises upon press fitting within the first area spreads to a lesser degree to the cog path via the second area.

Figure 3:
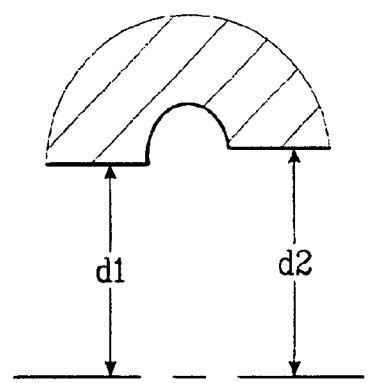
FIG. 3 shows an enlargement of the indicated area in FIG. 2.

According to the enlarged view shown in FIG. 3, it is clear that the through-hole exhibits a larger diameter d2 within the second area 6 than the corresponding diameter d1 within the first area 7. In this case, the gearwheel is intended to be mounted onto a shaft with a cross section of constant diameter.

Figure 4:
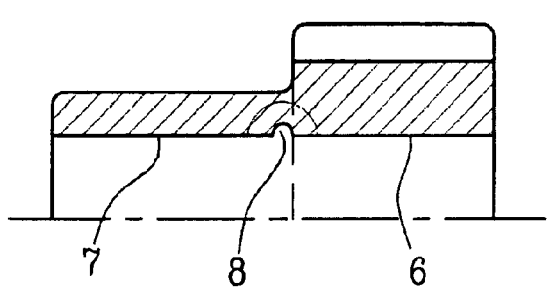
FIG. 4 is a symmetry half side cross-sectional view of the gearwheel according to a second embodiment of the invention.
Figure 5:
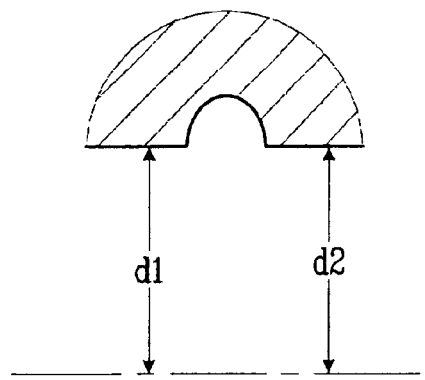
FIG. 5 shows an enlargement of the indicated area in FIG. 4.
Figure 6:
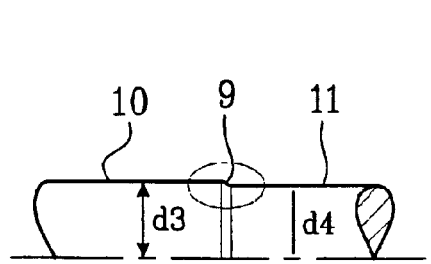
FIG. 6 is a symmetry half side cross-sectional view of a shaft, upon which the gearwheel is intended to be press fitted.
Figure 7:
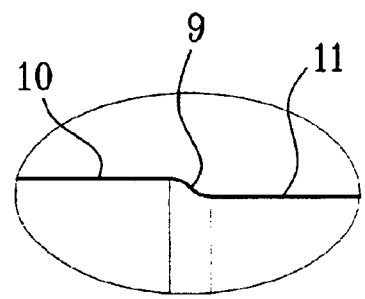
FIG. 7 shows an enlargement of the indicated area in FIG. 6.

In FIGS. 4 and 5 a second embodiment of the invention is shown in which the diameters d1 and d2 of the through-hole at the first and second areas 6, 7 are of the same size. This gearwheel is intended to be mounted onto a shaft as shown in FIGS. 6 and 7 which exhibits a mantle surface 9 with a first area 10 of a diameter d3, exceeding the diameter d4 of a second area 11 of the mantle surface. When mounting the gearwheel onto this shaft in such a way that the second area 6 of the gearwheel, i.e. the area lying radially inside the cog path, is positioned radially outside the second area 11 of the shaft, and the first area 7 of the gearwheel, i.e. the one lying axially outside the cog path, is placed radially outside the first area 10 of the shaft, the tension within the first areas 7, 10 will exceed the tension within the second areas 6, 11.

The invention is not limited to the embodiment described above and shown in the drawings, but can be varied within the scope of the appended claims. For example, the first area 7, 10, i.e. the one situated axially inside the cog path, may be made from a material that exhibits greater resistance towards deformation than the material from which the second area 6, 11, situated radially inside the cog path, is made. In a further embodiment, the gearwheel can be manufactured with greater material thickness within the first area 7, i.e. the one situated axially inside the cog path, than within the second area 6. The radius within the first area 7 thereby becomes greater than the radius within the second area 6. In this manner, a greater contact pressure will arise within the first area during press fitting onto a shaft with constant cross section. Combinations of the mentioned methods to achieve the advantages of the invention may also be contemplated.

What is claimed is:

1. A gearwheel assembly intended to be connected through press fitting to a shaft, said gearwheel comprising:
   a hub and a cog path connected to the hub, said hub exhibiting at least one flank extending axially outside the cog path and a through-hole with a first area situated axially outside said cog path and a second area situated radially inside said cog path; and
   said gearwheel configured to have a mean contact pressure within said first area substantially greater than a mean contact pressure within said second area resulting from press fitting said gearwheel onto a shaft intended therefor.

2. The gearwheel assembly according to claim 1, further comprising:
   a shaft upon which said gearwheel is press fit.

3. The gearwheel assembly according to claim 2, wherein said through-hole has a diameter smaller than a diameter of the shaft and the difference in the diameter measured within the first area and the diameter of the shaft is greater than the difference in diameter measured within the second area and the diameter of the shaft.

4. A gearwheel assembly according to claim 3, wherein the through-hole exhibits a smaller diameter within the first area than within the second area.

5. A gearwheel assembly according to claim 1, wherein a relief zone is situated between the first area and the second area.

6. A gearwheel assembly according to claim 5, wherein said relief zone is formed as a groove in the mantle surface of the through-hole.

7. A shaft assembly for supporting a press fitted gearwheel having a hub and a cog path connected to the hub, the hub exhibiting at least one flank that extends axially outside the cog path whereby the hub exhibits a through-hole with a first area situated axially outside the cog path and a second area situated radially inside the cog path, said shaft assembly comprising:
   a shaft configured to have a mean contact pressure within said first area substantially greater than a mean contact pressure within said second area resulting from press fitting said shaft onto a gearwheel intended therefor.

8. The shaft assembly according to claim 7, further comprising:
   a gearwheel into which said shaft is press fit, said gear wheel having a hub and a cog path connected to the hub, the hub exhibiting at least one flank that extends axially outside the cog path whereby the hub exhibits a through-hole with a first area situated axially outside the cog path and a second area situated radially inside the cog path.

9. The shaft assembly according to claim 7, wherein the gearwheel exhibits a cylindrical through-hole having a diameter smaller than the diameter of the shaft and that the difference in diameter between the through-hole and shaft at the first area exceeds the difference in diameter between the through-hole and shaft at the second area.

10. The shaft assembly according to claim 9, wherein the through-hole exhibits a smaller diameter within the first area than within the second area.

11. The shaft assembly according to claims 10, wherein a relief zone is situated between the first area and the second area on the gearwheel.

12. The shaft assembly according to claim 11, wherein said relief zone is formed as a groove in the mantle surface of the through-hole.

13. A gearwheel and shaft assembly comprising:
   a gearwheel including a hub and a cog path connected to the hub, said hub exhibiting at least one flank extending axially outside the cog path and a through-hole with a first area situated axially outside said cog path and a second area situated radially inside said cog path;
   a shaft having a corresponding first area located to be positioned adjacent to the first area of said gearwheel and axially outside said cog path and a corresponding second area located to be positioned adjacent to the second area of said gearwheel and inside said cog path when said gearwheel is press fit onto said shaft; and
   said gearwheel press fit upon said shaft and configured to have a mean contact pressure within said first area substantially greater than a mean contact pressure within said second area.

14. The gearwheel and shaft assembly according to claim 13, wherein said through-hole has a diameter smaller than a diameter of the shaft and the difference in the diameter measured within the first area and the diameter of the shaft is greater than the difference in diameter measured within the second area and the diameter of the shaft.

15. A gearwheel and shaft assembly according to claim 14, wherein the through-hole exhibits a smaller diameter within the first area than within the second area.

16. A gearwheel and shaft assembly according to claim 13, further comprising:
   a relief zone is situated between the first area and the second area of said gearwheel.

17. A gearwheel and shaft assembly according to claim 16, wherein said relief zone is shaped as a radial arc.

18. A gearwheel and shaft assembly according to claim 16, wherein said relief zone is crossed-sectionally shaped as a half-circle.

19. A gearwheel and shaft assembly comprising:
- a gearwheel including a hub and a cog path joined together at a connection therebetween, said hub exhibiting at least one flank extending axially outside the cog path and beyond the connection, and said hub having a through-hole establishing a first interior area located axially outside said cog path out of radial alignment with said cog path, and a second interior area of said through-hole located axially inside said cog path in radial alignment with said cog path and said connection between said cog path and said hub;
- a shaft having a corresponding first exterior area positioned adjacent to, and in pressed engagement with, the first interior area of said hub of said gearwheel, said first exterior area being located axially outside said cog path out of radial alignment with said cog path when said gearwheel is press fit onto said shaft;
- said shaft having a corresponding second exterior area positioned adjacent to, and in pressed engagement with, the second interior area of said hub of said gearwheel, said second exterior area being located axially inside said cog path in radial alignment with said cog path when said gearwheel is press fit onto said shaft; and
- said gearwheel being press fit upon said shaft and configured to have a mean positive contact pressure between said press engaged first interior and exterior areas substantially greater than a positive mean contact pressure between said press engaged second interior and exterior areas.

20. The gearwheel and shaft assembly according to claim 19, wherein radially aligned portions of said through-hole have cross-sectionally measured interior diameters smaller than corresponding portions of radially aligned, cross-sectionally measured exterior diameters of said shaft thereby establishing said press fit between said gearwheel and said shaft.

21. The gearwheel and shaft assembly according to claim 19, further comprising:
- shaft diameter and interior through-hole diameter measured at said second area is greater than a difference in exterior shaft diameter and interior through-hole diameter measured at said first area.

22. A gearwheel and shaft assembly according to claim 19, further comprising:
- a relief zone situated between said first and second areas of said gearwheel.

23. A gearwheel and shaft assembly according to claim 22, wherein said relief zone is shaped as a radial arc.

* * * * *

UNITED STATES PATENT AND TRADEMARK OFFICE
CERTIFICATE OF CORRECTION

PATENT NO.     : 6,951,150 B2
DATED          : October 4, 2005
INVENTOR(S)    : Anders Hedman It is certified that error appears in the above-identified patent and that said Letters Patent is hereby corrected as shown below:

<u>Column 6,</u>
Line 15, insert -- a difference in exterior -- before "shaft diameter and interior...".

Signed and Sealed this

Sixth Day of June, 2006

JON W. DUDAS
*Director of the United States Patent and Trademark Office*